US010943070B2

(12) United States Patent
Koseki et al.

(10) Patent No.: US 10,943,070 B2
(45) Date of Patent: Mar. 9, 2021

(54) INTERACTIVELY BUILDING A TOPIC MODEL EMPLOYING SEMANTIC SIMILARITY IN A SPOKEN DIALOG SYSTEM

(71) Applicant: INTERNATIONAL BUSINESS MACHINES CORPORATION, Armonk, NY (US)

(72) Inventors: Akira Koseki, Yokohama (JP); Masaki Ono, Tokyo (JP); Toshiro Takase, Urayasu (JP); Akihiro Kosugi, Machida (JP)

(73) Assignee: International Business Machines Corporation, Armonk, NY (US)

(*) Notice: Subject to any disclaimer, the term of this patent is extended or adjusted under 35 U.S.C. 154(b) by 107 days.

(21) Appl. No.: 16/265,177

(22) Filed: Feb. 1, 2019

(65) Prior Publication Data

US 2020/0250269 A1    Aug. 6, 2020

(51) Int. Cl.
| | |
|---|---|
| G06F 17/27 | (2006.01) |
| G10L 15/00 | (2013.01) |
| G10L 15/14 | (2006.01) |
| G06F 40/30 | (2020.01) |
| G06N 3/04 | (2006.01) |
| G06N 3/08 | (2006.01) |

(52) U.S. Cl.
CPC .......... *G06F 40/30* (2020.01); *G06N 3/0454* (2013.01); *G06N 3/08* (2013.01)

(58) Field of Classification Search
CPC ...... G06F 40/30; G06F 40/216; G06F 40/284; G06N 3/0454; G06N 3/08
USPC .................................................. 704/9, 256.7
See application file for complete search history.

(56) References Cited

U.S. PATENT DOCUMENTS 8,291,319 B2 * 10/2012 Li ........................ G06F 16/951
715/709
8,687,792 B2 * 4/2014 Yacoub ............... H04M 3/5166
379/265.06

(Continued)

FOREIGN PATENT DOCUMENTS

WO    2016173326 A1    11/2016

OTHER PUBLICATIONS

Hsueh et al., "Automatic Topic Segmentation and Labeling in Multiparty Dialogue", Conference Paper from Spoken Language Technology Workshop. IEEE X-plore. Jan. 2007. pp. 1-5.

(Continued)

*Primary Examiner* — Khai N. Nguyen
(74) *Attorney, Agent, or Firm* — Tutunjian & Bitetto, P.C.; Randall Bluestone

(57) ABSTRACT

A computer-implemented method is presented for building a topic model to discover topics in a collection of documents generated by a plurality of users. The method includes extracting conversations from the collection of documents, dividing the extracted conversations into a plurality of segments, generating a topic distribution for each of the plurality of segments based on the extracted conversations and a first pre-defined prior probability distribution, and generating continuous value constructs for each of the topic distributions based on an external corpus and a second pre-defined prior probability distribution, wherein similarity is defined between the continuous value constructs.

20 Claims, 8 Drawing Sheets

(56) References Cited

U.S. PATENT DOCUMENTS

| | | | | |
|---|---|---|---|---|
| 9,031,844 B2* | 5/2015 | Yu | | G10L 15/14 704/256 |
| 9,123,022 B2* | 9/2015 | Skarin | | G06F 16/22 |
| 9,594,825 B2* | 3/2017 | Skarin | | G06Q 10/10 |
| 2005/0238161 A1* | 10/2005 | Yacoub | | H04M 3/5166 379/265.06 |
| 2011/0055699 A1* | 3/2011 | Li | | G06F 16/951 715/709 |
| 2011/0072052 A1* | 3/2011 | Skarin | | G06F 16/22 707/794 |
| 2012/0072215 A1* | 3/2012 | Yu | | G10L 15/14 704/240 |
| 2013/0275429 A1* | 10/2013 | York | | G06F 16/435 707/737 |
| 2015/0356571 A1* | 12/2015 | Chang | | H04L 51/32 705/7.29 |
| 2016/0012121 A1* | 1/2016 | Skarin | | G06F 16/22 707/736 |
| 2017/0075991 A1* | 3/2017 | Kataria | | G06F 16/337 |
| 2017/0235848 A1* | 8/2017 | Van Dusen | | G06F 16/904 705/12 |
| 2017/0371861 A1* | 12/2017 | Barborak | | G06N 3/006 |
| 2018/0225361 A1* | 8/2018 | Skarin | | G06Q 10/10 |
| 2019/0130244 A1* | 5/2019 | Mars | | G06N 20/00 |
| 2019/0155947 A1* | 5/2019 | Chu | | G06F 40/117 |
| 2020/0046285 A1* | 2/2020 | Shimmei | | A61B 5/7246 |

OTHER PUBLICATIONS

Guo et al., "Topic-based Evaluation for Conversational Bots", 31st Conference on Neural Information Processing Systems (NIPS 2017). arXiv prepring; arXiv:1801.03622v1. Jan. 11, 2018. pp. 1-10.

* cited by examiner

INTERACTIVELY BUILDING A TOPIC MODEL EMPLOYING SEMANTIC SIMILARITY IN A SPOKEN DIALOG SYSTEM

BACKGROUND

Technical Field

The present invention relates generally to dialog systems, and more specifically, to interactively building a topic model employing semantic similarity in a dialog system.

Description of the Related Art

Spoken language understanding is a key component in human-computer conversational interaction systems. Existing spoken dialog systems operate in single-user scenarios, where a user speaks to the system and the system provides feedback in response to the user's request. Many existing spoken dialog systems are application-specific and capable of responding only to requests within limited domains. Each domain represents a single content area such as search, movie, music, restaurant, shopping, flights, etc. Limiting the number of domains generally allows spoken dialog systems to be more accurate, but requires the user to resort to different resources for different tasks.

SUMMARY

In accordance with an embodiment, a method is provided for building a topic model to discover topics in a collection of documents generated by a plurality of users. The method includes extracting conversations from the collection of documents, dividing the extracted conversations into a plurality of segments, generating a topic distribution for each of the plurality of segments based on the extracted conversations and a first pre-defined prior probability distribution, and generating continuous value constructs for each of the topic distributions based on an external corpus and a second pre-defined prior probability distribution, wherein similarity is defined between the continuous value constructs.

In accordance with another embodiment, a system is provided for building a topic model to discover topics in a collection of documents generated by a plurality of users. The system includes a memory and one or more processors in communication with the memory configured to extract conversations from the collection of documents, divide the extracted conversations into a plurality of segments, generate a topic distribution for each of the plurality of segments based on the extracted conversations and a first pre-defined prior probability distribution, and generate continuous value constructs for each of the topic distributions based on an external corpus and a second pre-defined prior probability distribution, wherein similarity is defined between the continuous value constructs.

In accordance with yet another embodiment, a non-transitory computer-readable storage medium including a computer-readable program for building a topic model to discover topics in a collection of documents generated by a plurality of users is presented. The non-transitory computer-readable storage medium performs the steps of extracting conversations from the collection of documents, dividing the extracted conversations into a plurality of segments, generating a topic distribution for each of the plurality of segments based on the extracted conversations and a first pre-defined prior probability distribution, and generating continuous value constructs for each of the topic distributions based on an external corpus and a second pre-defined prior probability distribution, wherein similarity is defined between the continuous value constructs.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The invention will provide details in the following description of preferred embodiments with reference to the following figures wherein.

Throughout the drawings, same or similar reference numerals represent the same or similar elements.

DETAILED DESCRIPTION

Figure 1:
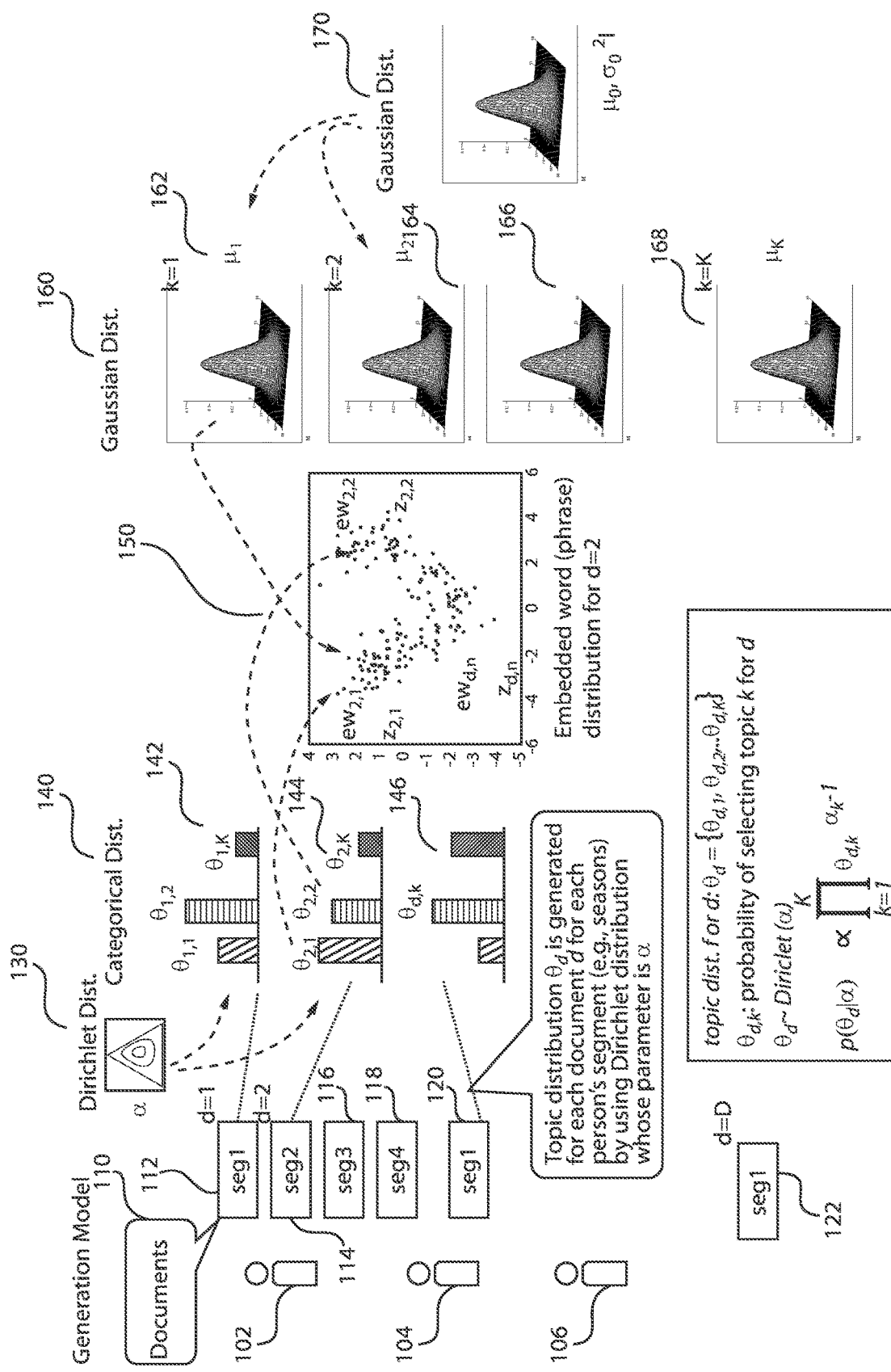
FIG. 1 is an exemplary generation model, in accordance with an embodiment of the present invention.

Embodiments in accordance with the present invention provide methods and devices for building a topic model in a dialog system, which segments conversations, generates continuous-value constructs, estimates parameters, and assigns weights to each construct by using, e.g., Gibbs sampling.

A spoken dialog system is a computer-based machine designed to converse with a human. A dialog between the machine and the user relies on turn-taking behavior. For example, a user can ask the machine to locate an Italian restaurant in downtown. In response to the request, the machine can state it was unable find any Italian restaurants in downtown. The user's request and the machine act or response form one turn in the dialog. As the dialog progresses, the spoken dialog system is able to obtain the information needed to complete one or more user goals (e.g., provide the name and location of an Italian restaurant).

Conventional dialog systems are widely used in the information technology industry, especially in the form of mobile applications for wireless telephones and tablet computers. Generally, a dialog system refers to a computer-based agent having a human-centric interface for accessing, processing, managing, and delivering information. Dialog systems are also known as chat information systems, spoken dialog systems, conversational agents, chatter robots, chatterbots, chatbots, chat agents, digital personal assistants, automated online assistants, and so forth. All these terms are within the scope of the present disclosure and referred to as a "dialog system" for simplicity.

Traditionally, a dialog system interacts with its users in natural language to simulate an intelligent conversation and provide personalized assistance to the users. For example, a user can generate requests to the dialog system in the form of conversational questions, such as "Where is the nearest hotel?" or "What is the weather like in New York?" and receive corresponding answers from the dialog system in the form of audio and/or displayable messages. The users can also provide voice commands to the dialog system requesting the performance of certain functions including, for example, generating e-mails, making phone calls, searching particular information, acquiring data, navigating, requesting notifications or reminders, and so forth. These and other functionalities make dialog systems very popular because they are of great help, especially for holders of portable electronic devices such as smart phones, cellular phones, tablet computers, gaming consoles, and the like.

The exemplary embodiments of the present invention augment the dialog system experience by observing, segmenting and storing user dialog system conversation exchanged during a time interval in a space-vector representation, generating a topic distribution for each segment by generating continuous value constructs (keywords, phrases) for each topic based on analysis of stored conversations, an external corpus, and pre-defined probability distribution of each construct into continuous values from the space-vector representation, and estimating parameters of topic distribution, construct distribution, and hidden topic for generating and proposing a candidate topic to the user for new conversation by using Gibbs sampling.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

Figure 2:
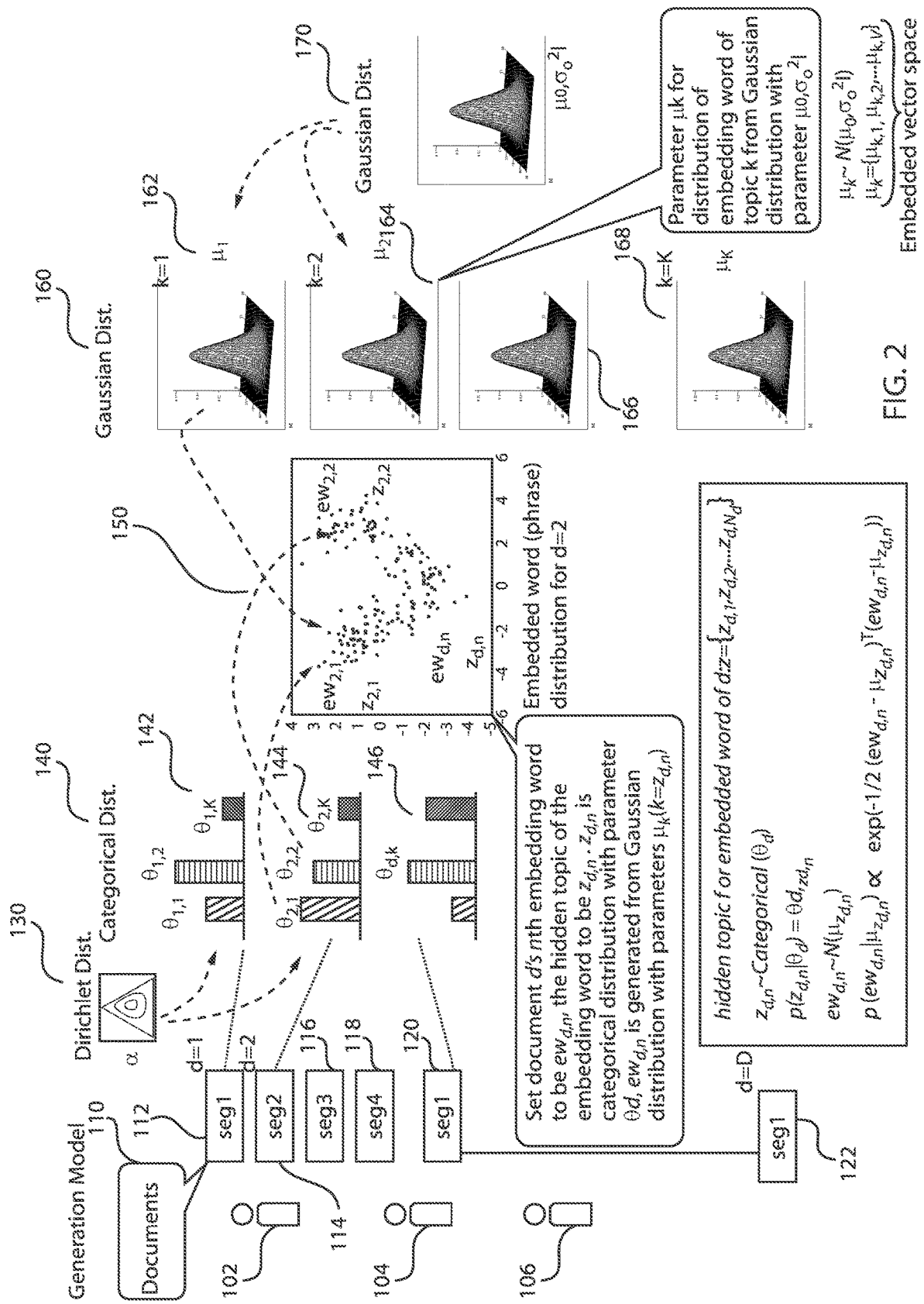
FIG. 2 is an exemplary generation model of FIG. 1 with further explanations regarding the embedded vector space, in accordance with an embodiment of the present invention.

FIG. 1 is an exemplary generation model, in accordance with an embodiment of the present invention, whereas FIG. 2 is an exemplary generation model of FIG. 1 with further explanations regarding the embedded vector space, in accordance with an embodiment of the present invention.

Accurate prediction of conversation topics can be a valuable signal for creating coherent and engaging dialog systems. Detecting conversation topics and keywords can be used to guide dialog systems towards coherent dialog.

In machine learning and natural language processing, a topic model is a type of statistical model for discovering the abstract "topics" that occur in a collection of documents. Topic modeling is a frequently used text-mining tool for discovery of hidden semantic structures in a text body. Intuitively, given that a document is about a particular topic, one would expect particular words to appear in the document more or less frequently. Topic modelling is employed to extract topics from large corpora of texts, e.g., web documents and scientific articles. A "topic" includes a cluster of words that frequently occur together. Using contextual clues, topic models can connect words with similar meanings and distinguish between uses of words with multiple meanings. A "topic model" can also be thought of as an algorithm for discovering the main themes that pervade a large and otherwise unstructured collection of documents. Topic models can organize the collection according to the discovered themes.

A topic model captures this intuition in a mathematical framework, which allows examining a set of documents and discovering, based on the statistics of the words in each, what the topics might be and what each document's balance of topics is. Latent Dirichlet Allocation (LDA) uses unsupervised learning methods, and learns the topic distributions from the data itself, by iteratively adjusting priors. Topic models are also referred to as probabilistic topic models, which refers to statistical algorithms for discovering the latent semantic structures of an extensive text body. Topic models can help to organize and offer insights to understanding collections of unstructured text.

In FIG. 1, a generation model is created as follows. Users 102, 104, 106 create documents 110. The documents 110 can be, e.g., conversations. The conversations can be between a first entity and a second entity. The first and second entities can be people. However, the documents 110 can be any type of text. The documents 110 are divided into segments. For example, a first document 112 created by the first user 102 can have a plurality of segments. A second document 114, a third document 116, a and a fourth document 118 can each be divided into a plurality of segments. A first document 120 created by the second user 104 can have a plurality of segments and a first document 122 created by the third user 106 can have a plurality of segments. The segments go through a Dirichlet distribution 130 so that each segment has a topic distribution 140. Thus, element 140 is the topic distribution of each document (or segment). For example, the segments of the first document 112 of the first user 102 can have a topic distribution 142, the segments of the second document 114 of the first user 102 can have a topic distribution 144, and the segments of the first document 120 of the second user 104 can have a topic distribution 146. Therefore, each document of each user is divided into a plurality of segments and each segment from each document of all the users has a topic distribution. Stated differently, a topic distribution $\theta_d$ is generated for each document d for each person's segment (e.g., seasons), by using Dirichlet distribution whose parameter is $\alpha$.

In mathematical terms:

Topic distribution for $d$: $\theta_d = \{\theta_{d,1}, \theta_{d,2}, \ldots \theta_{d,K}\}$ $\theta_{d,k}$: probability of selecting topic k for d $\theta_d \sim \text{Diriclet}(\alpha)$ $p(\theta_d|\alpha) \propto \Pi_{k=1}^{K} \theta_{d,k}^{\alpha_k - 1}$ Embedded keywords and phrases 150 can be extracted or collected from the documents 110 and can be mapped. The mapping is of the mean of embedded words for each topic. Word embedding is the collective name for a set of language modeling and feature learning techniques in natural language processing (NLP) where words or phrases from the vocabulary are mapped to vectors of real numbers. Word embeddings are thus vector representations of a particular word. Word2Vec is one popular technique to learn word embeddings using shallow neural networks. Word2Vec is a two-layer neural net that processes text. Its input is a text corpus and its output is a set of vectors: feature vectors for words in that corpus. While Word2Vec is not a deep neural network, it turns text into a numerical form that deep nets can understand. The purpose and usefulness of Word2Vec is to group the vectors of similar words together in vector space. That is, Word2Vec detects similarities mathematically. Word2Vec creates vectors that are distributed numerical representations of word features, features such as the context of individual words. Word2Vec does so without human intervention. Given enough data, usage and contexts, Word2Vec can make highly accurate guesses about a word's meaning based on past appearances. Those guesses can be used to establish a word's association with other words (e.g., "man" is to "boy" what "woman" is to "girl"), or cluster documents and classify them by topic. The output of the Word2Vec neural net is a vocabulary in which each item has a vector attached to it, which can be fed into a deep-learning net or simply queried to detect relationships between words.

Regarding the embedded words, the exemplary methods set document d's nth embedding word to be $ew_{d,n}$ and the hidden topic of the embedding word to be $z_{d,n}$. $z_{d,n}$ is generated from a categorical distribution with parameter $\theta_d$ and $ew_{d,n}$ is generated from a Gaussian distribution with parameters $\mu_k$ ($k=z_{d,n}$).

In mathematical terms:

The hidden topic for embedded word of $d$: $z=\{z_{d,1}, z_{d,2}, \ldots z_{d,N_d}\}$ $z_{d,n} \sim \text{Categorical}(\theta_d)$ $p(z_{d,n}|\theta_d) = \theta_{d,z_{d,n}}$ $ew_{d,n} \sim N(\mu_{z_{d,n}})$ $p(ew_{d,n}|\mu_{z_{d,n}}) \propto \exp(-\frac{1}{2}(ew_{d,n}-\mu_{z_{d,n}})^T(ew_{d,n}-\mu_{z_{d,n}}))$ The above equations can be employed to indicate to which topic each embedded word is categorized.

After similarity is defined between constructs, it is determined if the constructs are close to or far from the mean value in the topic (or theme). The constructs distribution is evaluated based on a Gaussian distribution 170 with a fixed mean and variance. The Gaussian distribution of different topic categories is also shown (162, 164, 166, 168). For example, Gaussian distribution 162 can be a continuous-value construct (keywords, phrases) distribution generated from a topic or theme derived from the second document 114 of the first user 102. Similarly, the Gaussian distribution 166 can be a continuous-value construct distribution generated from a topic or theme derived from the first document 120 of the second user 104. Therefore, a Gaussian distribution can be generated for each topic of each document of each user.

Stated differently, parameter $\mu_k$ is employed for distribution of embedding word of topic k from Gaussian distribution with parameter $\mu_0$, $\sigma_0^2 I$.

In mathematical terms:

$\mu_k \sim N(\mu_0, \sigma_0^2 I)$ $\mu_k = \{\mu_{k,1}, \mu_{k,2}, \ldots \mu_{k,V}\}$ Referring back to FIG. 1, the generation model creates segments which correspond to conversation in a certain period (e.g., seasons), and a generation model is created in which each segment has a topic distribution. The parameters of the topic distribution can be generated from an appropriate prior distribution.

Each topic (or theme) generates continuous-value constructs (keywords, phrases). Similarity is defined between any constructs, and generation probability lowers if the construct is far from the mean value in the topic (or theme). The parameters of distribution of constructs are generated from an appropriate prior distribution. In other words, generation probability depends on the relationship between the construct and the mean or a generation probability is adjusted based on a distance between the continuous value constructs and a mean value of a corresponding topic distribution.

The constructs (keywords, phrases) are collected from an external corpus and encoded into continuous values using, e.g., word2vec or other embedding technologies. The corpus can be a large and unstructured set of texts or documents. Unstructured text can be information that either does not have a pre-defined data model or is not organized in a pre-defined manner.

A generation model is shown in FIGS. 1 and 2. Topic distribution is a categorical distribution (multinomial distribution when n=1) with fixed topic category numbers whose prior distribution is a Dirichlet distribution with parameter $\alpha$. Also, constructs distribution for each category is a Gaussian distribution with fixed variance and means calculated by corresponding values of constructs within the same category, whose prior distribution is, for example, Gaussian distribution with mean $\mu_0$, variance $\sigma_0^2 I$.

Regarding how Parameters are Estimated:

After observing constructs in each segment, parameters of topic distribution, construct distribution, and hidden parameters (hidden topic for constructs) are estimated using, e.g., Gibbs sampling. Gibbs sampling or a Gibbs sampler is a Markov Chain Monte Carlo (MCMC) algorithm for obtaining a sequence of observations which are approximated from a specified multivariate probability distribution when direct sampling is difficult.

When the external corpus is relatively small, distributions are thought to be estimated because using prior distributions and the construct distribution is a continuous distribution.

Regarding Runtime and Dynamic Updates of Parameters:

An appropriated segment is selected and by using the segment's topic distribution, a candidate topic and construct (keyword, phrase) in the topic are generated. Because the candidate construct is a continuous value, the nearest observed value is used for a topic proposal. Therefore, the methods can output proposed topics to a user.

According to whether the topic is acceptable or not, parameters of the above generation model are updated so as to heighten the generation probability of the accepted construct and to lower the generation probability of the unaccepted construct. Therefore, the generation probability of each construct can be adjusted in real-time.

Moreover, the method changes the hidden topic of the construct and near constructs, and re-performs Gibbs sampling. The freshness of the topic is reflected by lowering the generation probability of old constructs. The observation probability in the generation model of the constructs can be lowered by considering a time decay.

Figure 3:
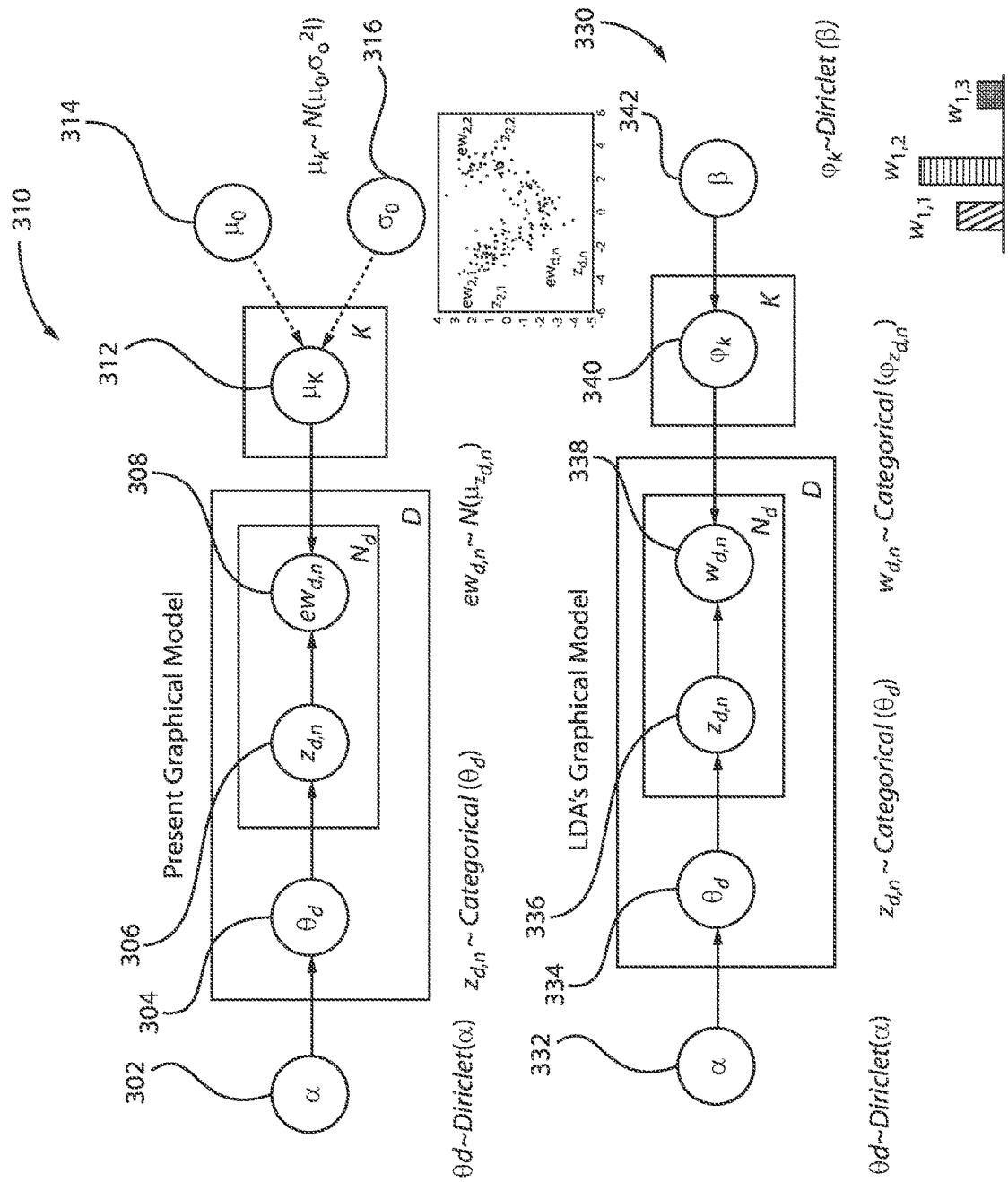
FIG. 3 is an exemplary diagram illustrating the differences between the present graphical model and convention graphical models, in accordance with an embodiment of the present invention.

FIG. 3 is an exemplary diagram illustrating the differences between the present graphical model and convention graphical models, in accordance with an embodiment of the present invention. In the present graphical model, words and phrases can be represented in continuous space so that similarity among those can be exploited.

LDA and other topic models are part of the larger field of probabilistic modeling. In generative probabilistic modeling, the data is treated as arising from a generative process that includes hidden variables. This generative process defines a joint probability distribution over both the observed and hidden random variables. Data analysis is performed by using that joint distribution to compute the conditional distribution of the hidden variables given the observed variables. This conditional distribution is also called the posterior distribution.

LDA falls precisely into this framework. The observed variables are the words of the documents, the hidden variables are the topic structure, and the generative process is as described herein.

Topic modeling algorithms generally fall into two categories, that is, sampling-based algorithms and variational algorithms. Sampling-based algorithms attempt to collect samples from the posterior to approximate it with an empirical distribution. The most commonly used sampling algorithm for topic modeling is Gibbs sampling, where a Markov chain is constructed, that is a sequence of random variables, each dependent on the previous, whose limiting distribution is the posterior. The Markov chain is defined on the hidden topic variables for a particular corpus, and the algorithm is to run the chain for a long time, collect samples from the limiting distribution, and then approximate the distribution with the collected samples. Variational methods are a deterministic alternative to sampling-based algorithms. Rather than approximating the posterior with samples, variational methods posit a parameterized family of distributions over the hidden structure and then find the member of that family that is closest to the posterior. Thus, the inference problem is transformed to an optimization problem.

Regarding the LDA graphical model 330, it is assumed that topics exist outside the document vocabulary. Each topic is a distribution over a fixed vocabulary and each word is drawn from one of those topics. Additionally, each document is a random mixture of corpus-wide topics. The goal of LDA is to infer the hidden (latent) variables, that is, to compute their distribution conditioned on the documents.

The LDA graphical model 330 includes a Dirichlet parameter 332 (or proportions parameter) designated as $\alpha$, a per-document topic proportions 334 designated as $\theta_d$, a per-word topic assignment 336 designated as $z_{d,n}$, an observed word 338 designated as $w_{d,n}$, a word distribution 340 designated as $\varphi_k$, and topics 342 designated as $\beta$. Each piece of the structure is a random variable. Thus, from a collection of documents, d, the LDA graphical model 330 infers the per-word topic assignment $z_{d,n}$, the per-document topic proportions $\theta_d$, and the per-corpus topic distributions $\beta_k$. Posterior expectations are employed to perform the task, that is information retrieval or document similarity.

In contrast, the graphical model 310 of the present invention includes a Dirichlet parameter 302 (or proportions parameter) designated as $\alpha$, a per-document topic proportions 304 designated as $\theta_d$, a per-construct topic assignment 306 designated as $z_{d,n}$, an embedded word 308 designated as $ew_{d,n}$, and $\mu_k$, which is the mean of the construct distribution and is designated as 312, which involves calculation of a mean $\mu_0$ designated as 314 and a standard deviation $\sigma_0$ designated as 316. Thus, mean and variance data is employed in the topic distribution model to adjust generation probability of constructs.

Figure 4:
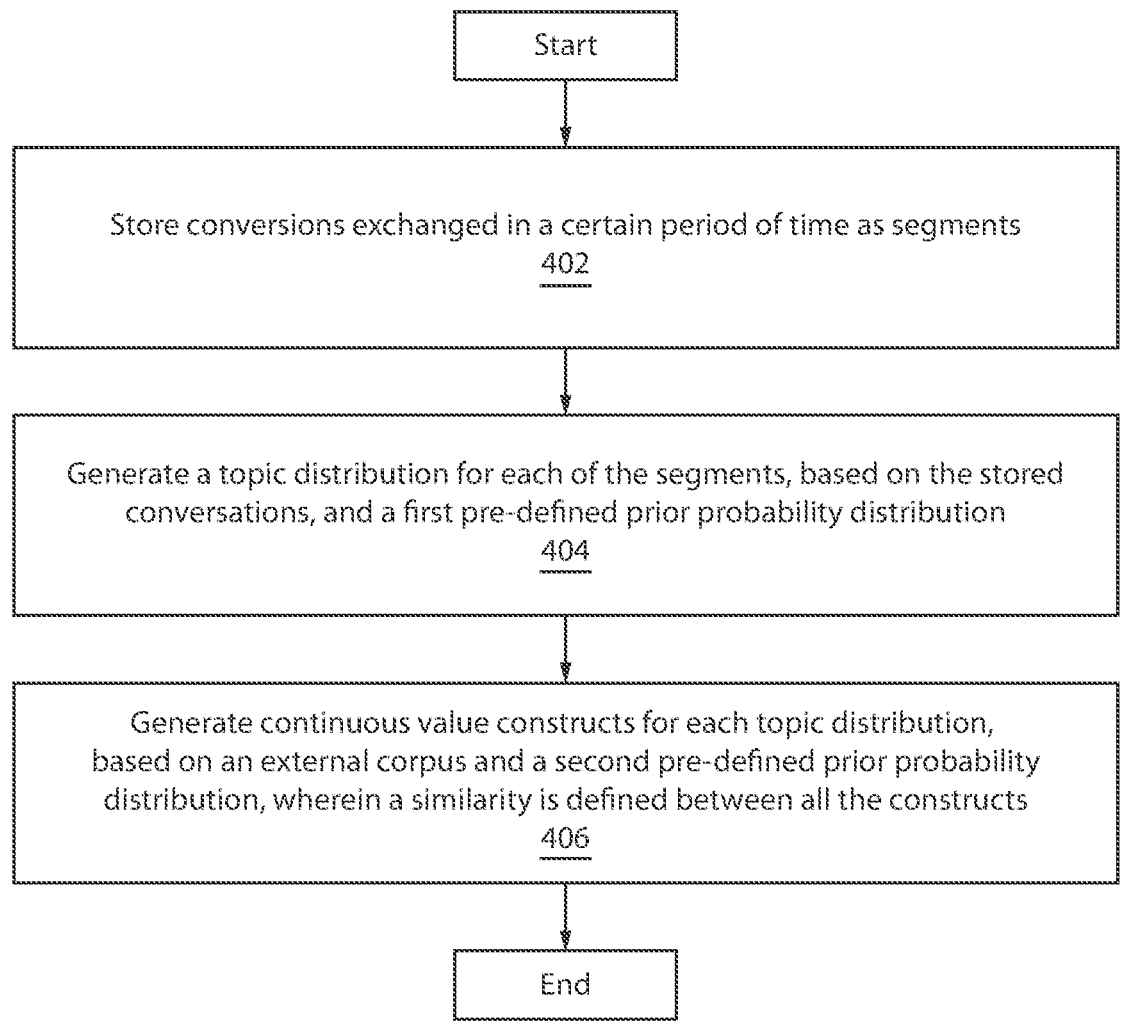
FIG. 4 is a block/flow diagram of an exemplary method for building a topic model, in accordance with an embodiment of the present invention.

FIG. 4 is a block/flow diagram of an exemplary method for building a topic model, in accordance with an embodiment of the present invention.

At block 402, store conversations exchanged in a certain period of time as segments.

At block 404, generate a topic distribution for each of the segments, based on the stored conversations, and a first pre-defined prior probability distribution.

At block 406, generate continuous value constructs for each topic distribution, based on an external corpus and a second pre-defined prior probability distribution, wherein a similarity is defined as any constructs.

Figure 5:
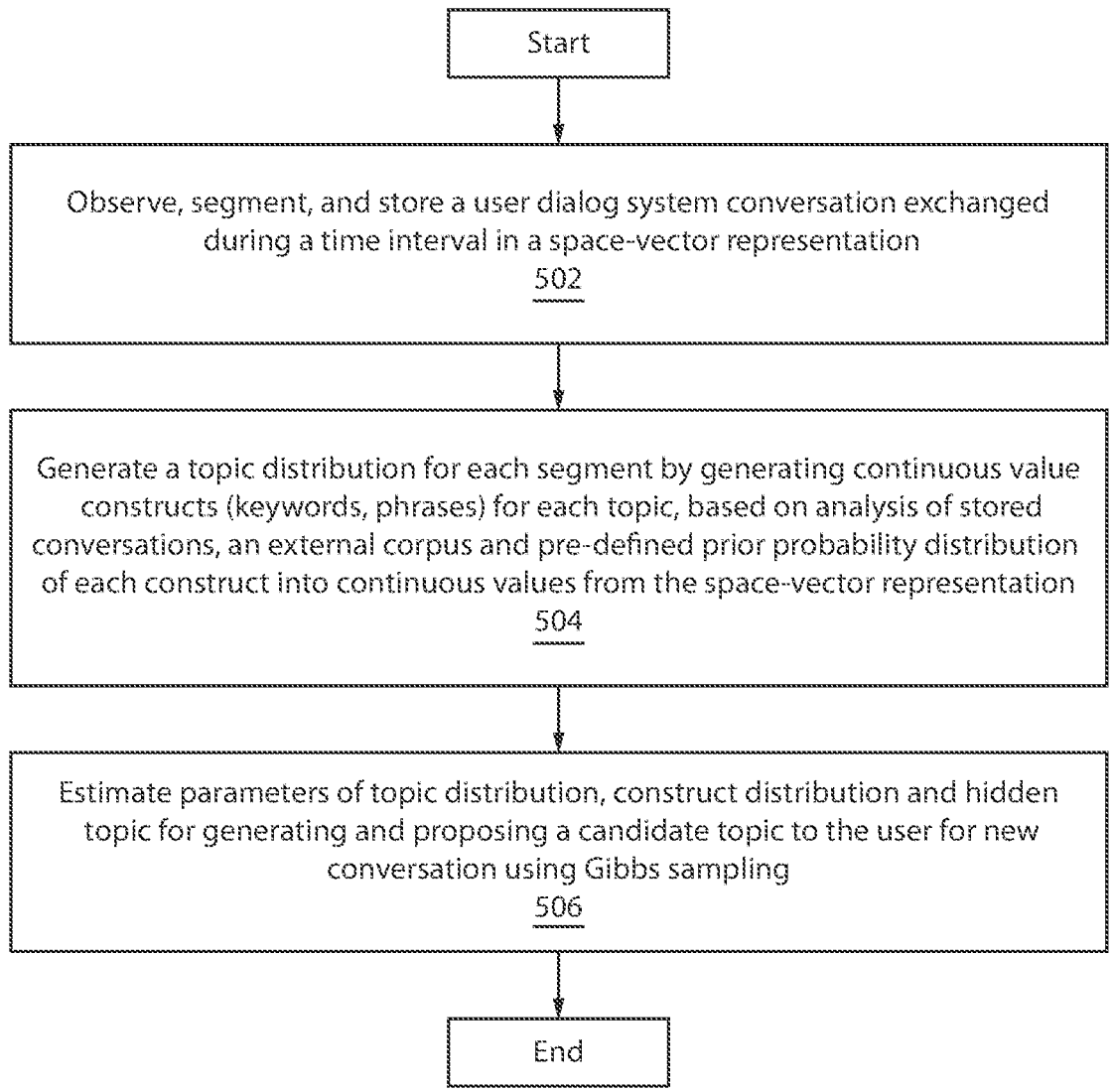
FIG. 5 is a block/flow diagram of an exemplary method for generating and proposing a new topic model to a user relating to a new conversation, in accordance with an embodiment of the present invention.

FIG. 5 is a block/flow diagram of an exemplary method for generating and proposing a new topic model to a user relating to a new conversation, in accordance with an embodiment of the present invention.

At block 502, observe, segment, and store a user dialog system conversation exchanged during a time interval in a space-vector representation.

At block 504, generate a topic distribution for each segment by generating continuous value constructs (keywords, phrases) for each topic, based on analysis of stored conversations, an external corpus and pre-defined probability distribution of each construct into continuous values from the space-vector representation.

At block 506, estimate parameters of topic distribution, construct distribution and hidden topic for generating and proposing a candidate topic to the user for new conversation using Gibbs sampling.

Therefore, in conclusion, the topic model generates continuous values whose similarity is reflected to the probabilistic model, the above-mentioned continuous values indicate hidden meaning of words and phrases that are constructs of the conversation, and can be used when accumulated data are relatively small and recent topics can be reflected. Moreover, the differences between the exemplary embodiments of the present invention and the conventional art is that existing methods have difficulty using phrases for topic distribution because the variation of the phrases is huge and that via the embedded word distribution, the exemplary methods are aware of the center of the topic and thus can find representative words of the topic.

The output of the system can thus be a recommendation or suggestion of a candidate topic which can spark conversation(s) between one or more people. The practical application relates to dialog systems where people are encouraged to converse. The elements of the methods and systems are thus integrated into the practical application of a dialog system to trigger and maintain conversations. The improvement involves predicting relevant or pertinent or suitable topics of interest from existing topic distributions or conversation topics. The candidate topics can be continuously updated or adjusted based on mean values of the inputs received by the system in real-time. As conversations or conversation topics between people change or evolve, the mean and variance of the received constructs affect what candidate topics to recommendation or propose or suggest to propagate meaningful conversations. The predictions of topics can evolve as the conversations evolve into various topic areas.

The present invention is applicable to a wide variety of dialog system modalities, both input and output, capable of responding to conversational inputs such as, but not limited to, speech, writing (e.g., text or handwriting), touch, gesture, and combinations thereof (e.g., multi-mode systems) addressed to the computer or another human in a multi-user conversation. For example, the dialog system can be responsive to an instant messaging conversation (i.e., text-based conversational inputs) or a voice conversation (i.e., speech-based conversational inputs) between users that includes conversational inputs that can be expressly or implicitly addressed to the dialog system. Embodiments generally described in the context of a modality-specific dialog system (e.g., a spoken dialog system) are merely illustrative of one suitable implementation and should not be construed as limiting the scope to any particular modality or modalities or a single modality and should be read broadly to encompass other modalities or inputs along with the corresponding hardware and/or software modifications to implement other modalities.

Figure 6:
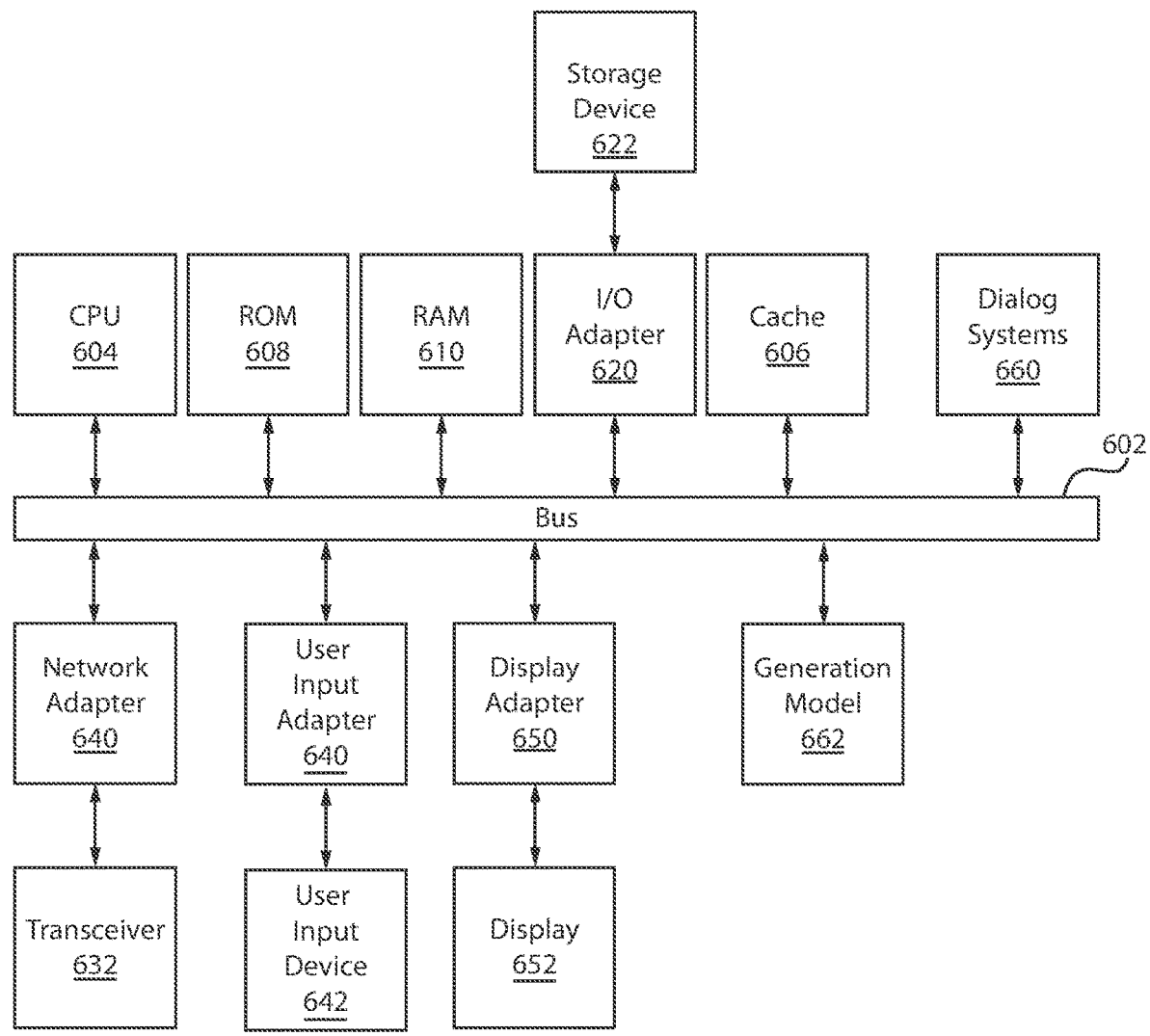
FIG. 6 is an exemplary processing system incorporating a dialog system, in accordance with embodiments of the present invention.

FIG. 6 is a block/flow diagram illustrating an example processing system for generating tool-specific alerting rules based on abnormal and normal patterns from history logs, in accordance with an embodiment of the present invention.

The processing system includes at least one processor (CPU) 604 operatively coupled to other components via a system bus 602. A cache 606, a Read Only Memory (ROM) 608, a Random Access Memory (RAM) 610, an input/output (I/O) adapter 620, a network adapter 630, a user interface adapter 640, and a display adapter 650, are operatively coupled to the system bus 602. Additionally, a dialog system platform 660 can communicate through the system bus 602. Moreover, a generation model can operate via the system bus 602.

A storage device 622 is operatively coupled to system bus 602 by the I/O adapter 620. The storage device 622 can be any of a disk storage device (e.g., a magnetic or optical disk storage device), a solid state magnetic device, and so forth.

A transceiver 632 is operatively coupled to system bus 602 by network adapter 630.

User input devices 642 are operatively coupled to system bus 602 by user interface adapter 640. The user input devices 642 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 642 can be the same type of user input device or different types of user input devices. The user input devices 642 are used to input and output information to and from the processing system.

A display device 652 is operatively coupled to system bus 602 by display adapter 650.

Of course, the processing system can also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 7:
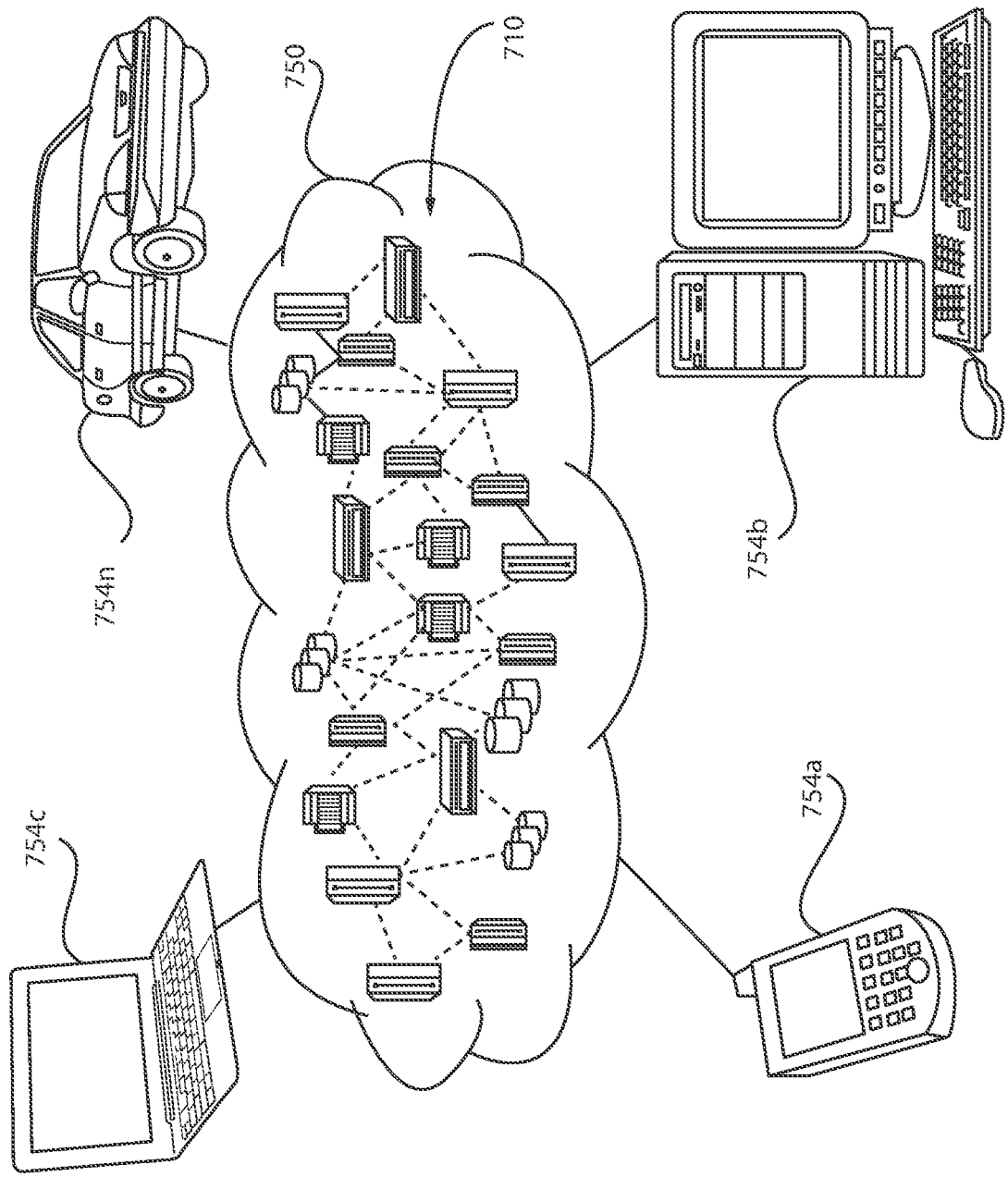
FIG. 7 is a block/flow diagram of an exemplary cloud computing environment, in accordance with an embodiment of the present invention.

FIG. 7 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 750 is depicted for enabling use cases of the present invention. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N can communicate. Nodes 710 can communicate with one another. They can be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
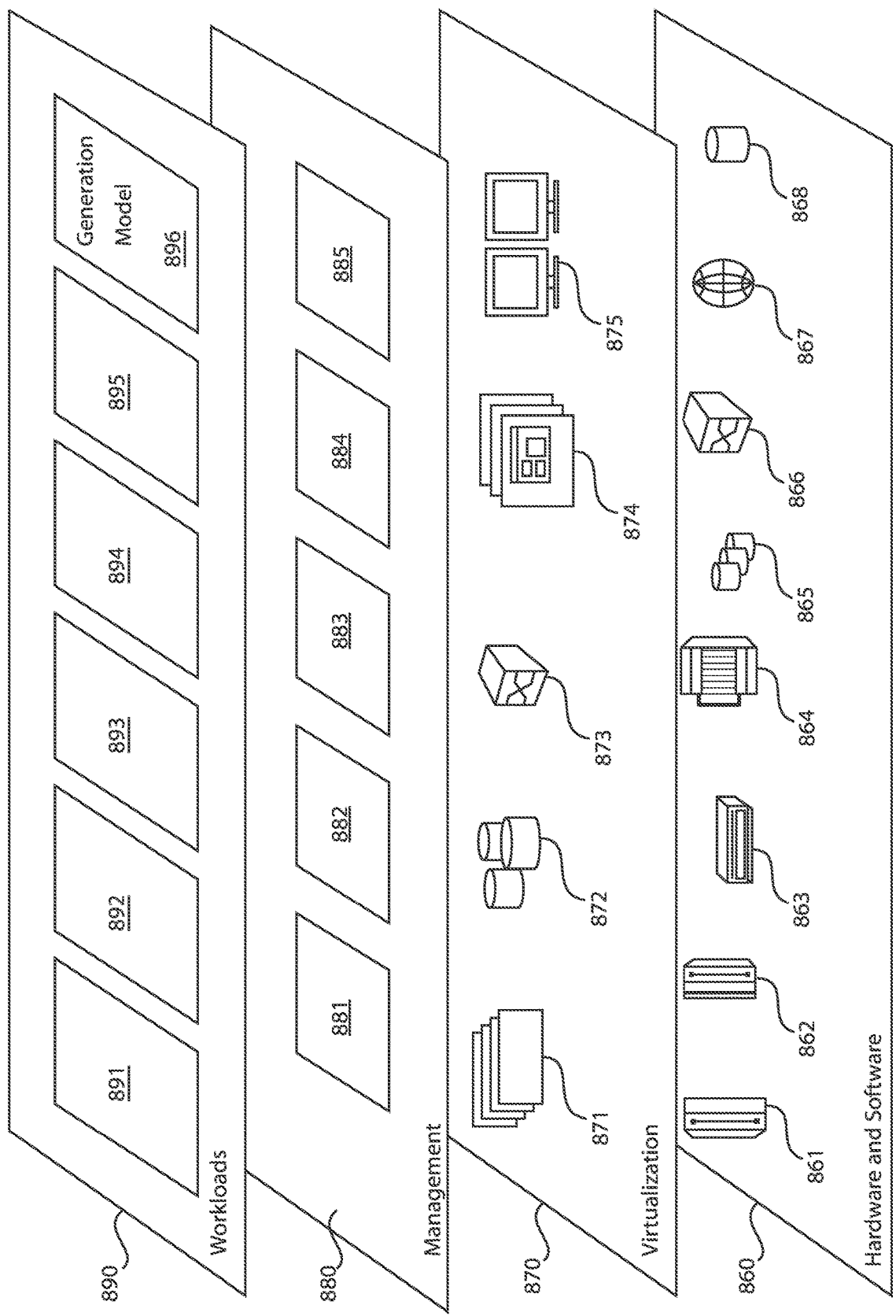
FIG. 8 is a schematic diagram of exemplary abstraction model layers, in accordance with an embodiment of the present invention.

FIG. 8 is a schematic diagram of exemplary abstraction model layers, in accordance with an embodiment of the present invention. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities can be provided: virtual servers 871; virtual storage 872; virtual networks 873, including virtual private networks; virtual applications and operating systems 874; and virtual clients 875.

In one example, management layer 880 can provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment can be utilized. Examples of workloads and functions which can be provided from this layer include: mapping and navigation 891; software development and lifecycle management 892; virtual classroom education delivery 893; data analytics processing 894; transaction processing 895; and a generation model 896.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of a system and method for interactively building a topic model employing semantic similarity in a dialog system (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer implemented method executed on a processor for building a topic model to discover topics in a collection of documents generated by a plurality of users, the method comprising steps of:
    extracting conversations from the collection of documents;
    dividing the extracted conversations into a plurality of segments;
    generating a topic distribution for each of the plurality of segments based on the extracted conversations and a first pre-defined prior probability distribution;
    generating continuous value constructs for each of the topic distributions based on an external corpus and a second pre-defined prior probability distribution, wherein similarity is defined between the continuous value constructs; and
    generating a Gaussian distribution for each topic distribution of each document of the collection of documents.

2. The method of claim 1, further comprising observing the continuous value constructs in each of the plurality of segments.

3. The method of claim 2, further comprising estimating parameters of the topic distributions, construct distributions, and hidden topics for the continuous value constructs by using Gibbs sampling.

4. The method of claim 3, further comprising selecting an appropriate segment of the plurality of segments based on time.

5. The method of claim 4, further comprising generating a candidate topic and constructs in the candidate topic by using the second pre-defined prior probability distribution.

6. The method of claim 1, wherein a generation probability is adjusted based on a distance between the continuous value constructs and a mean value of a corresponding topic distribution.

7. The method of claim 1, wherein constructs distribution for each topic category is a Gaussian distribution with fixed variance and means calculated by corresponding values of constructs within a same topic category whose prior distribution can be a Gaussian distribution with mean $\mu_0$ and variance $\sigma_0^2 I$.

8. A non-transitory computer-readable storage medium comprising a computer-readable program executed on a processor in a data processing system for building a topic model to discover topics in a collection of documents generated by a plurality of users, wherein the computer-readable program when executed on the processor causes a computer to perform the steps of:
    extracting conversations from the collection of documents;
    dividing the extracted conversations into a plurality of segments;
    generating a topic distribution for each of the plurality of segments based on the extracted conversations and a first pre-defined prior probability distribution;
    generating continuous value constructs for each of the topic distributions based on an external corpus and a second pre-defined prior probability distribution, wherein similarity is defined between the continuous value constructs; and
    generating a Gaussian distribution for each topic distribution of each document of the collection of documents.

9. The non-transitory computer-readable storage medium of claim 8, wherein the continuous value constructs are observed in each of the plurality of segments.

10. The non-transitory computer-readable storage medium of claim 9, wherein parameters of the topic distributions, construct distributions, and hidden topics for the continuous value constructs are estimated by using Gibbs sampling.

11. The non-transitory computer-readable storage medium of claim 10, wherein an appropriate segment of the plurality of segments is selected based on time.

12. The non-transitory computer-readable storage medium of claim 11, wherein a candidate topic and constructs in the candidate topic are generated by using the second pre-defined prior probability distribution.

13. The non-transitory computer-readable storage medium of claim 8, wherein a generation probability is adjusted based on a distance between the continuous value constructs and a mean value of a corresponding topic distribution.

14. The non-transitory computer-readable storage medium of claim 8, wherein constructs distribution for each topic category is a Gaussian distribution with fixed variance and means calculated by corresponding values of constructs within a same topic category whose prior distribution can be a Gaussian distribution with mean $\mu_0$ and variance $\sigma_0^2 I$.

15. An system for building a topic model to discover topics in a collection of documents generated by a plurality of users, the system comprising:
    a memory; and
    one or more processors in communication with the memory configured to:
        extract conversations from the collection of documents;
        divide the extracted conversations into a plurality of segments;
        generate a topic distribution for each of the plurality of segments based on the extracted conversations and a first pre-defined prior probability distribution;
        generate continuous value constructs for each of the topic distributions based on an external corpus and a second pre-defined prior probability distribution, wherein similarity is defined between the continuous value constructs; and generate a Gaussian distribution for each topic distribution of each document of the collection of documents.

16. The system of claim 15, wherein the continuous value constructs are observed in each of the plurality of segments.

17. The system of claim 16, wherein parameters of the topic distributions, construct distributions, and hidden topics for the continuous value constructs are estimated by using Gibbs sampling.

18. The system of claim 17, wherein an appropriate segment of the plurality of segments is selected based on time.

19. The system of claim 18, wherein a candidate topic and constructs in the candidate topic are generated by using the second pre-defined prior probability distribution.

20. The system of claim 15, wherein a generation probability is adjusted based on a distance between the continuous value constructs and a mean value of a corresponding topic distribution.

* * * * *